United States Patent [19]

Wheeler

[11] Patent Number: 5,406,348
[45] Date of Patent: Apr. 11, 1995

[54] CAMERA CONTROL/AUTOFOCUSING SYSTEM

[75] Inventor: Richard B. Wheeler, Webster, N.Y.

[73] Assignee: Eastman Kodak Company, Rochester, N.Y.

[21] Appl. No.: 157,868

[22] Filed: Nov. 24, 1993

[51] Int. Cl.⁶ .................. G03B 13/36; G03B 7/00; G03B 15/03; G03B 17/40
[52] U.S. Cl. .................. 354/402; 354/419; 354/420; 354/430; 354/238.1
[58] Field of Search .............. 354/402, 419, 420, 422, 354/430, 238.1

[56] References Cited

U.S. PATENT DOCUMENTS

| | | | |
|---|---|---|---|
| 3,208,363 | 9/1965 | Easterly et al. | 352/78 |
| 3,526,177 | 9/1970 | Kiper et al. | 95/10 |
| 3,641,888 | 2/1972 | Durr | 95/10 |
| 3,938,165 | 2/1976 | Asano | 354/550 |
| 4,710,013 | 12/1987 | Wong | 354/419 |
| 4,727,389 | 2/1988 | Raschke | 354/402 |
| 4,827,119 | 5/1989 | Gaboury | 250/214 |
| 4,989,093 | 1/1991 | Kaneko | 358/213.19 |
| 5,037,198 | 8/1991 | Gaboury | 356/218 |
| 5,049,916 | 9/1991 | O'Such et al. | 354/412 |

FOREIGN PATENT DOCUMENTS 50-10763 4/1975 Japan.

OTHER PUBLICATIONS

RD-329-023-A, Anonymous Aug. 20, 1991.

Primary Examiner—W. B. Perkey
Attorney, Agent, or Firm—Marc Rossi

[57] ABSTRACT

A camera system incorporates an autofocus system of simple and inexpensive design that provides improved photospace coverage. The autofocus system utilizes both a measurement of the intensity level of ambient light and a determination of whether the ambient light is natural or artificial to set lens focus position, aperture opening, shutter time and operation of a flash unit.

17 Claims, 4 Drawing Sheets

CAMERA CONTROL/AUTOFOCUSING SYSTEM

FIELD OF THE INVENTION

The invention relates in general to automatic camera systems. More specifically, the invention relates to a camera system incorporating an autofocusing system that operates based on the intensity and type of ambient light to be imaged.

BACKGROUND OF THE INVENTION

Many inexpensive photographic cameras do not have the ability to adjust the lens focus based on the primary subject distance. The primary reason for excluding automatic focusing (AF) capability from cameras is the expense associated with conventional AF systems. A fixed-focus camera system can incorporate a less expensive lens and does not require the AF electronics and/or mechanical interfaces required in AF camera systems. It is well known, however, that a substantial system speed and image performance loss results from the exclusion of lens focusing capability in a fixed-focus camera system.

Attempts have been made to correlate ambient light levels with a preferred lens-focus position. These methods recognize that cameras without exposure control are likely to produce under exposed images below a threshold light level. An electronic flash unit must therefore be employed to obtain a useful film exposure. The range of an electronic flash unit is limited, however, thus the focus point for the camera lens must be brought within the flash range. If the flash is used and the ambient aperture and lens focus position are retained, unnecessary depth-of-field (extending well beyond the useful flash range) is imparted to the image, and flash power is wasted due to the small lens opening. If the ambient lens focus position is retained and a larger lens opening is used for flash, flash power is used more efficiently, but the focus point lies outside the optimum flash focus point. As a result, the depth-of-field is not correctly or optimally positioned within the flash range.

U.S. Pat. No. 4,710,013, for example, discloses a photographic camera system that controls lens position, flash and diaphragm/aperture settings based on a measured ambient light level. Although the disclosed system is described as an "autofocusing mechanism", the system can more appropriately be described as a light-level based lens positioning system, since the lens position is not related to the image location/subject position. Specifically, the lens is positioned alternately for distant and near objects based on the measured ambient light level. If the ambient light level is below a preset threshold level, the control system activates a flash unit, moves the diaphragm to a fully open position, and move the lens to a position for near objects. When the ambient light is above the preset threshold level, the control system deactivates the flash unit, sets the diaphragm at a reduced opening, and moves the lens to the distant position. Above the threshold light level, the largest aperture setting is the hyperfocal aperture corresponding to the far focus lens setting. A further reduction in aperture below the hyperfocal value is governed by a film speed entry system.

The system described above has a number of limitations. For example, while the system recognizes the futility in maintaining depth-of-focus sufficient to cover objects well outside the flash range, it is a practical fact that the difference between the hyperfocal aperture and the flash aperture decreases as the flash guide number increases. In such a case, the center of the flash exposure range (assuming a fixed flash output) is coincident with the daylight hyperfocal distance. As a result, the same aperture and lens focus position should be used for both flash and daylight scenes. Further opening of the aperture and reduction of the lens-focus point distance, however, would provide a poorer alignment of the depth-of-focus and the useful flash range which results in less satisfactory coverage of photospace. The system is therefore only useful for very low output flash units, and even then causes a serious tradeoff in photospace (light levels and distances) coverage in the flash mode. If the daylight nominal-daylight aperture were used, virtually all of the flash pictures would be underexposed which would be a more serious problem. Another potential problem results from the inability of the system to photograph scenes that may lie below the daylight set point, yet are beyond the flash range. Virtually all indoor or night sporting events, exhibitions and entertainment events fall into this category. One could incorporate a ranging autofocus system in conjunction with the exposure control system, but this would substantially increase the cost and complexity of the camera system.

In view of the above, it would be desirable to provide an autofocus system of simple and inexpensive design that provides improved photospace coverage, particularly for scenes that fall below daylight threshold levels, over the type of system described above.

SUMMARY OF THE INVENTION

The invention provides a camera system incorporating an autofocus system of simple and inexpensive design that provides improved photospace coverage. The autofocus system utilizes both a measurement of the intensity level of ambient light and a determination of whether the ambient light is natural or artificial to set lens focus position, aperture opening and flash.

The camera system preferably includes a lens that is adjustable between a plurality of positions, an aperture that is adjustable between a plurality of openings, a shutter mechanism, a flash unit, a mechanism for measuring the intensity of ambient light, a mechanism for determining whether the ambient light is natural or artificial, and a camera control processor that controls the position of the lens, the opening of the aperture and the operation of the shutter and flash unit, based on the intensity and type of ambient light.

In a preferred embodiment discussed in greater detail below, the lens is adjustable between nominal-daylight, far and near positions, and the aperture is adjustable between small, mid-position and large openings. The camera control processor generates three different types of output settings by:

positioning the lens to the nominal-daylight position, setting the aperture to the small opening and deactivating the flash unit when the ambient light level is above a first threshold value;

positioning the lens to the far position, setting the aperture to the mid-position opening and deactivating the flash unit when the ambient light level is below the first threshold value but above a second threshold value, and the ambient light is artificial light; and positioning the lens to the near position, setting the aperture to the large opening and activating the flash unit, when the ambient light level is above the second threshold value and the ambient light is not artificial light.

The camera control processor also positions the lens to the near position, sets the aperture to the large opening and activates the flash unit when the ambient light level is below the second threshold value.

In a further embodiment, the camera system includes a self-timer circuit coupled to the camera control processor and a tripod sensor. In this embodiment, the camera control processor: positions the lens to the nominal-daylight position, opens the aperture to the small opening, does not activate the flash unit and controls the shutter to open for a normal exposure time period, when the ambient light level is above a first threshold value; positions the lens to the far position, sets the aperture to the mid-position opening, does not activate the flash unit and controls the shutter to open for the normal exposure time period, when the ambient light level is below the first threshold value and is above a second threshold value, and the ambient light is artificial light;

positions the lens to the far position, sets the aperture to the mid-position opening, does not activate the flash unit, and controls the shutter to open for an extended exposure period, when the ambient light level is below the first and second threshold values, the tripod sensor generates a tripod-present signal, the ambient light is natural light and the self-timer is not activated;

positions the lens to the near position, sets the aperture to the large opening, activates the flash unit and controls the shutter to open for the normal shutter time period, when the ambient light level is below the first and second threshold levels, the tripod sensor generates a tripod-present signal, the ambient light is natural light and the self timer is activated;

positions the lens to the near position, sets the aperture to the large opening, activates the flash unit and controls the shutter to open for the normal shutter time period, when the ambient light level is below the first and second threshold levels, the tripod sensor generates a tripod-present signal and the ambient light is not natural light; and positions the lens to the near position, sets the aperture to the large opening, activates the flash unit and controls the shutter to open for the normal shutter time period, when the ambient light level is below the first and second threshold levels and the tripod sensor does not generate a tripod-present signal.

The camera system preserves the cost advantages associated with the conventional camera systems of the type described above, while providing improved photospace coverage.

BRIEF DESCRIPTION OF THE DRAWINGS

The invention will be described in greater detail with reference to the accompanying drawings, wherein.

DETAILED DESCRIPTION OF PREFERRED EMBODIMENT

An improved autofocusing system in accordance with the invention measures the ambient light in two different ways. First, as with convention systems, the intensity of the ambient light is measured. Secondly, the fundamental frequency of the ambient light is measured and analyzed. The fundamental frequency of the ambient light is used to classify the type of lighting present (e.g. tungsten, fluorescent or natural). The measurement of both the type and level or intensity of ambient light provides predictors that more closely correlate with subject-camera distance. Specifically, scenes that fall below the minimum acceptable ambient light level and are outside the maximum flash range benefit the most. Many sporting events, exhibitions and entertainment events fall into this category, and often have predictable photospace requirements that can be accommodated, i.e., subjects are often located at great distances thereby allowing wider aperture selection.

Figure 1:
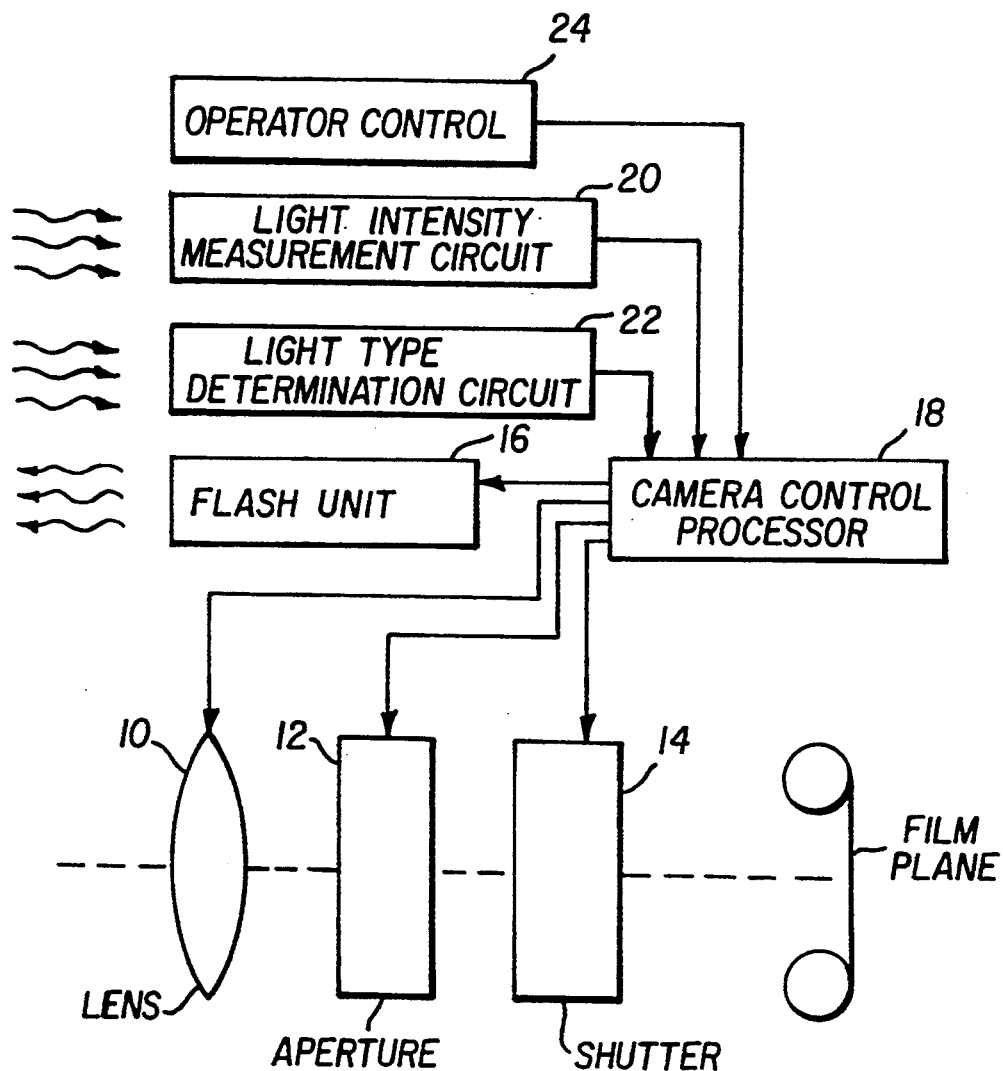
FIG. 1 is a block diagram of a camera system in accordance with a first embodiment of the invention.

Referring now to FIG. 1, a block diagram of a camera system in accordance with a first embodiment of the invention is shown including an adjustable lens 10, an adjustable aperture 12, a shutter 14 and a flash unit 16. The operation of the lens 10, aperture 12, shutter 14 and flash unit 16 are controlled by a camera control processor (CCP) 18, which is coupled to receive input signals from an ambient light intensity measurement circuit 20, an ambient light type determination circuit 22 (for example of the type disclosed in U.S. Pat. No. 4,827,119, the contents of which are herein incorporated by reference) and an operator control 24. In order to reduce the expense of the system, the flash unit 16 is preferably a fixed-output flash unit, the lens 10 is adjustable to only three positions (near, far and nominal-daylight), and the aperture 12 is adjustable to a small opening (nominal-daylight), a mid-position opening (between nominal-daylight and flash) and a large opening (flash). As is well known in the art, the nominal-daylight lens focus position, and the corresponding aperture (small opening) are selected such that the hyperfocal distance provides depth-of-field capable of covering all of the subject distances typically encountered in normal daylight photography. By definition, when the camera lens position is set to the hyperfocal distance, the resulting image will have depth-of-field that extends from one-half the hyperfocal distance to infinity. Therefore, a hyperfocal distance of 8 feet will provide acceptable depth-of-field for camera-subject distances ranging from 4 feet to infinity. While the present invention describes a nominal-daylight lens focus position and corresponding aperture having a hyperfocal distance of 8 feet, it is apparent to those skilled in the art that the advantages detailed herein would apply to a range of hyperfocal distances suitable for typical daylight photographs. For example, hyperfocal distances between, but not necessarily limited to, the range of 4 feet to 12 feet. The individual components illustrated in FIG. 1 are well known in the art and need not be discussed in detail. It will be understood that the illustrated components can be implemented using any desired structure and/or technology.

Figure 2:
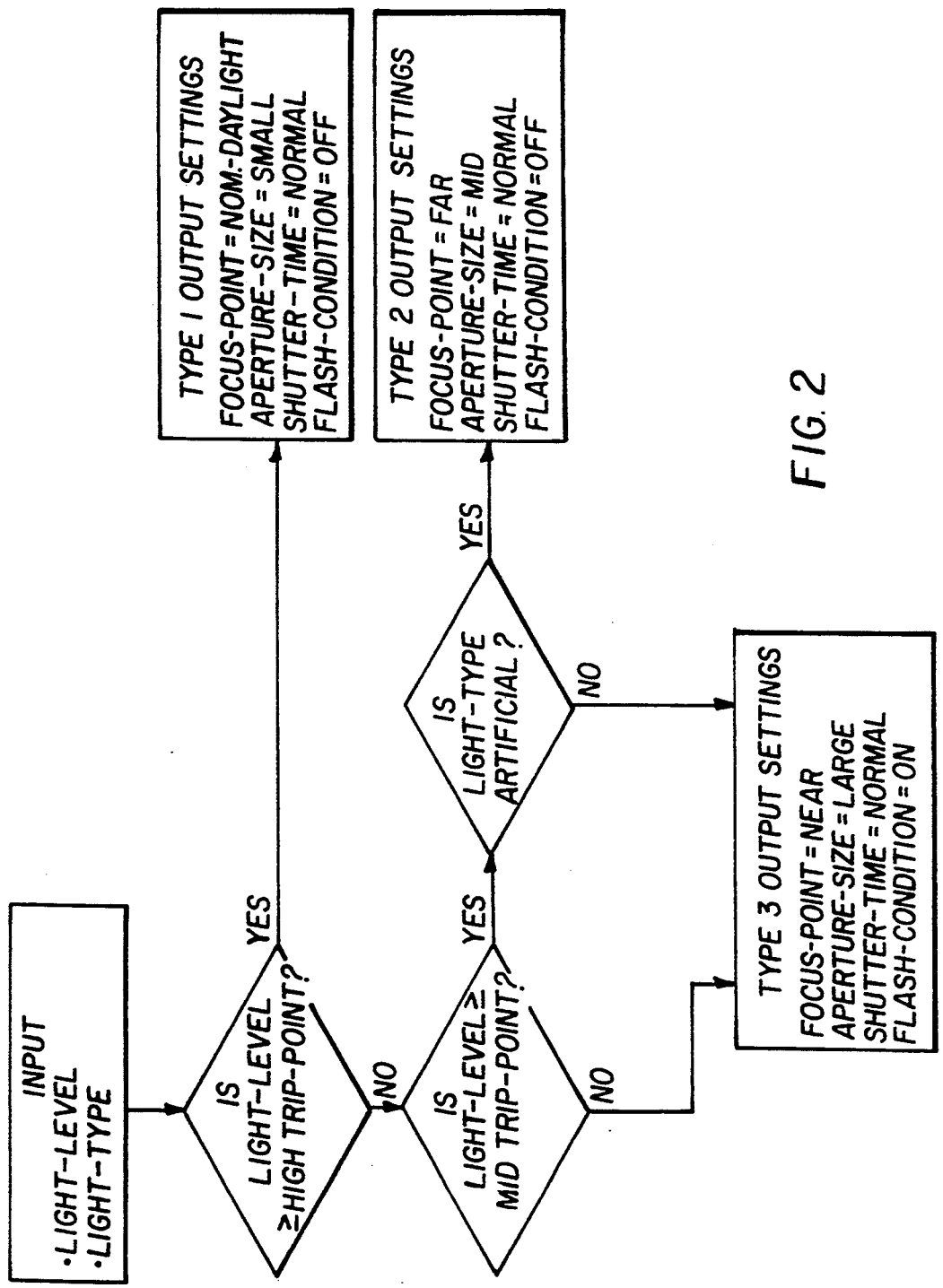
FIG. 2 is a flow diagram illustrating the operation of the camera system illustrated in FIG. 1.

FIG. 2 is a basic flow diagram illustrating the operation of the system shown in FIG. 1. Upon receiving an exposure activation signal from an operator input control 24, the CCP 18 determines whether the ambient light level is above a predetermined high threshold or trip-point based on a signal received from the ambient light intensity measurement circuit 20. If the ambient light level is above the high trip-point, the CCP 18 sets the lens 10 to the nominal-daylight position, sets the aperture 12 to the small (nominal-daylight) position and does not activate the flash unit 16 (Type One Output Settings). The CCP 18 then activates the shutter 14 to expose a photographic film located at the film plane for a predetermined normal exposure period. If the ambient light level is not above the predetermined high threshold, the CCP 18 determines whether the light level is above a mid-level trip-point. If the ambient light level is above the mid-level trip-point, the CCP 18 determines the type of light being imaged based on the signal received from the ambient light type determination circuit 22. If the ambient light is artificial, the CCP 18 sets the lens 10 to the far position, sets the aperture 12 to the mid-position opening and does not activate the flash unit 16 (Type Two Output Settings). If the ambient light is not artificial, the CCP 18 sets the lens 10 to the near position, sets the aperture 12 to the large opening and activates the flash unit 16 (Type Three Output Settings). Similarly, if the ambient light is not above the mid-level trip point, the CCP 18 also sets the lens 10, the aperture 12 and the flash unit 16 to the Type Three Output Settings.

The camera system would be set to the Type One output settings when the photographer is taking pictures under daylight illumination and objects from a variety of camera subject distances (close to the camera to infinity) must be reproduced sharply over a wide range of light levels. These conditions preferably require a nominal-daylight aperture and a nominal-daylight lens focus position for a fixed-focus camera that provides depth-of-field from about four feet to infinity. As a result, the exposure range is usually defined by the nominal-daylight aperture, the normal shutter time and the exposure latitude of the film.

The Type Two output settings would be used when the light level would produce exposures from the Type One output settings that are below the minimum exposure tolerance for the film (e.g. two stops underexposed) and the light type is artificial. This area of photospace is typical for many sports events, stage shows and exhibitions, which are usually photographed from points that are greater than ten feet from the subject. As a result, the preferred depth-of-field is ten feet to infinity. Since the depth-of-field requirement for Type Two output settings is less restrictive than the depth-of-field required for the Type One output settings, a larger aperture size (namely the mid- position opening) can be used, which then serves to extend the exposure range to light levels typical for the above-mentioned special events.

The Type Three camera settings are characteristic of low-light level ambient scenes that require electronic flash illumination. For these scenes, the flash output and the useful film latitude determine the aperture selection and exposure range. Inexpensive camera systems typically have a fixed output flash unit and a single lens aperture that are available for all low light scenes. In the case of system shown in FIG. 1, the lens focus point and aperture size are adjusted to provide an improved alignment of the exposure range and the center of the depth-of-field zone.

Figure 3:
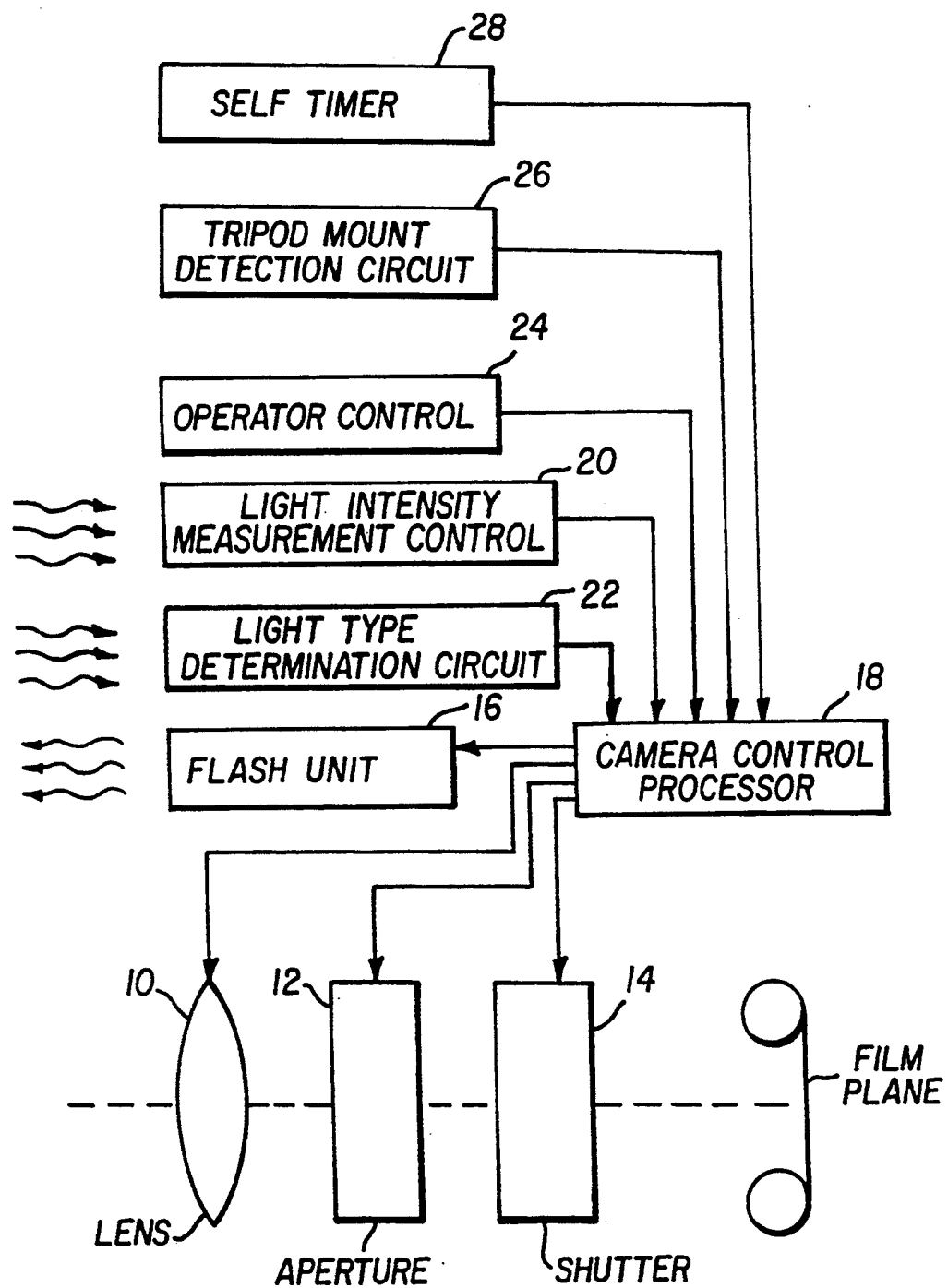
FIG. 3 is a block diagram of a camera system in accordance with a second embodiment of the invention.

A second embodiment of the invention will now be described with reference to FIG. 3. The second embodiment further includes a tripod mount detection circuit 26 and a self-timer mechanism 28 that are coupled to the CCP 18. The tripod mount detection circuit 26 generates a signal indicative on whether the camera system has been mounted to a tripod, and may include, for example, a pressure sensitive switch or optical sensor located on the base of the camera that is activated when the base makes contact with the tripod. U.S. Pat. No. 5,049,916, the contents of which are herein incorporated by reference, also discloses a type of tripod mount detection circuit that may be utilized. The self-timer mechanism 28 can be programmed to generate the exposure activation signal after a set period of time in a well known manner, thereby allowing the operator to take a self-portrait.

In operation, the second embodiment produces the same Type One and Type Two output settings as the first embodiment based on the same conditions. If the light level is not above the mid trip-point, however, the CCP 18 in the second embodiment checks to see whether a tripod is being used based on the signal received from the tripod mount detection circuit 26. If a tripod is being used, the CCP 18 then checks the type of ambient light that is present based on the output of the ambient light type determination circuit 22. If the ambient light is not natural, the CCP 18 produces the same Type Three output settings as utilized in the first embodiment. If the ambient light is natural, however, the CCP 18 determines whether the self-timer mechanism 28 has been activated. If the self-timer mechanism 28 has not been activated, the CCP 18 sets the lens 10 to the far position, sets the aperture 12 to the mid size opening, adjusts the shutter time to a longer or extended shutter time, as opposed to the normal shutter time used with the other output settings, and turns the flash unit off (Type Four output settings). If the self-timer mechanism 28 has been activated, the CCP 18 sets the lens 10, aperture 12, shutter time and flash operation to the Type Three output settings.

The Type Four output settings are characteristic of natural low light ambient scenes that do not require electronic flash illumination. Such scenes include, sunrises, sunsets, night streets, burning buildings, fireworks displays and low-light landscapes. As is the case with the Type Two output settings, these scenes normally do not contain subjects within ten feet of the camera. As a result, the aperture may be opened to the larger position than required for Type One photographic conditions, and the focus-point is moved further away from the camera (far position). In addition, since the logic sequence requires the connection of a tripod prior to the use of the Type Four output settings, the shutter time is extended to provide adequate exposure for the aforementioned low light ambient scenes. The inclusion of the self-timer check prevents the inadvertent photography of portraits in low-light ambient illumination with camera settings that would be appropriate for low light landscapes. For example, if the camera is hand-held at a low light condition, the system will select Type Three output settings and use electronic flash. If, however, the camera is placed on a tripod at a low light condition level and the self-timer mechanism 28 is not used, it is assumed that the photographer did not want to become part of the photograph and the Type Four output settings are employed. Finally, if the tripod and self-timer mechanism are both employed, it is assumed that the photographer will be entering the field of view of the camera lens and wishes to capture a portrait scene. Since the tripod coupling decision is made only at low light levels, it will still be possible for the photographer to use the tripod and self-timer mechanism freely at typical daylight levels of illumination without inadvertently causing the activation of the flash unit.

The following data illustrates the operational characteristics of a 135 format camera system, in accordance with the invention, that incorporates a 35 mm focal length lens and in which ISO 200 speed color negative film is employed. The alteration of the illustrated data to accommodate lenses of different focal lengths, films having different speeds and camera characteristics (shutter/aperture limits, image format, flash output, etc.) from those listed will be readily apparent to one of ordinary skill in the art. The following standard optical equations were utilized to determine lens position and depth-of-field data:

$H = FL^2/(F)(coc)$
$D_{near} = (H)(d)/(H+(d-FL))$
$D_{far} = (H)(d)/(H-(d-FL))$ where:
H = hyperfocal distance
FL = lens focal length
F = lens f-number (larger number denotes smaller opening)
coc = maximum circle of confusion at depth-of-field limits
$D_{near}$ = nearest object distance within depth-of-field
$D_{far}$ = farthest object distance within depth-of-field
d = lens focus position The following standard ANSI exposure equation (ANSI PH3.49-1971) was also employed:

$K = (LST)/A^2$ where:
K = K Factor (3.91 for "Sunny 16" Rule)
L = Scene Luminance in Foot-Lamberts (FL)
S = ISO (ASA) Film Speed
T = Shutter Time
A = Aperture (f-number)

The following examples are based on a maximum circle of confusion (depth-of-field limit) of 0.002 inches on the film or equivalently, 0.008 inches on the print, assuming a printing magnification of 4× (typical for 135 format 3.5 by 5.0 inch prints), a high threshold trip point of 60 Foot Lamberts, a mid-level trip point of 15 Foot Lamberts, and a flash guide number of approximately $32_{ISO\,200,feet}$. The following output settings were calculated:

Type One Output Settings

Lens Setting ≈ 8 Feet (Nominal-daylight Position)
Aperture ≈ f/9.5 (Small Aperture Setting)
Shutter ≈ 1/100 Sec. (Normal)
Flash = OFF
Photospace Data for Type One Output Settings:
  Depth-of-Field ≈ 4 Ft. to Infinity
  Exposure Range ≈ +2.5 Stops (1000 FL) to −1.5 Stops (60 FL)

Type Two Output Settings

Lens Setting ≈ 14 Feet (Far Position)
Aperture ≈ f/5.6 (Mid-Opening Aperture Setting)
Shutter ≈ 1/100 Sec. (Normal)
Flash = OFF
Photospace Data for Type Two Output Settings:
  Depth-of-Field ≈ 7 Feet to Infinity
  Exposure Range ≈ Normal (60 FL) to −2 Stops (15 FL)

Type Three Output Settings

Lens Setting ≈ 7 Feet (Near Position)
Aperture ≈ f/4.0 (Large Aperture Setting)
Shutter ≈ 1/100 Sec. (Normal)
Flash = ON
Photospace Data for Type Three Output Settings:
  Depth-of-Field ≈ 5 Feet. to 11 Feet.
  Exposure Range ≈ +1.5 Stops (5 Ft.) to −1 Stop (11 Ft.)

Type Four Output Settings

Lens Setting ≈ 14 Feet (Far Position)
Aperture ≈ f/5.6 (Mid Aperture Setting)
Shutter ≈ 1/15 Sec. (Extended)
Flash = ON
Photospace Data for Type Four Output Settings:
  Depth-of-Field ≈ 7 Feet to Infinity
  Exposure Range ≈ +1 Stop (15 FL) to −2 Stops (2 FL)

It has been observed that the difference between the required daylight focus-point and the required flash focus-point decreases as the guide number of the flash unit is increased. This means the same focus-point could be suitable for imaging conditions associated with both Type One output settings and Type Three output settings. The flash scenes associated with Type Three output settings, however, may still require a different aperture. Specifically, as the flash guide number increases, the f-number required to maintain a normal exposure at a given distance increases (smaller opening diameter of aperture). The smaller f-numbers impart additional depth-of-field to the scene and result in an optimum focus-position that will be coincident with the daylight (nominal-daylight) focus-point, if the guide number reaches a critical value. If the flash unit 16 is designed with a guide number greater than the critical value, the above-described system can be further simplified by allowing the same focus point to be employed for scenes associated with both Type One and Type Three output settings.

For example, given a 135 format camera with a 35 mm focal length lens, 0.008 inch circle-of-confusion tolerance on a resulting print, and a guide number expressed in feet, the following procedure can be utilized to determine the critical guide number. First, a determination of the underexposure limit for the film in use is made. The limit is expressed in terms of $Log_{10}E$ units (e.g. $10^{0.3} = 1$ stop). Secondly, the depth-of-field is then calculated for the desired flash aperture based on the daylight focus-point (Type One output settings). The critical guide number is then calculated using the following equation:

$$C = \frac{(D1)(f - number)}{\sqrt{10^E}}$$

where:
C = Critical Guide Number
D1 = max. distance (far depth-of-field limit)
E = exposure limit Assuming E = 0.3, which corresponds to an underexposure limit of one stop at the depth-of-field limit, the following results are obtained:

| Aperture | Depth-of-Field | Critical GN |
|----------|----------------|-------------|
| f/4.0 | 5.7–13.6 Ft. | 38.5 |
| f/5.6 | 5.1–18.8 Ft. | 74.5 |

If E=0.6, which corresponds to an underexposure limit of two stops at the depth-of-field limit, the following results are obtained:

| Aperture | Depth-of-Field | Critical GN |
|----------|----------------|-------------|
| f/4.0 | 5.7–13.6 Ft. | 27.3 |
| f/5.6 | 5.1–18.8 Ft. | 52.8 |

Figure 4:
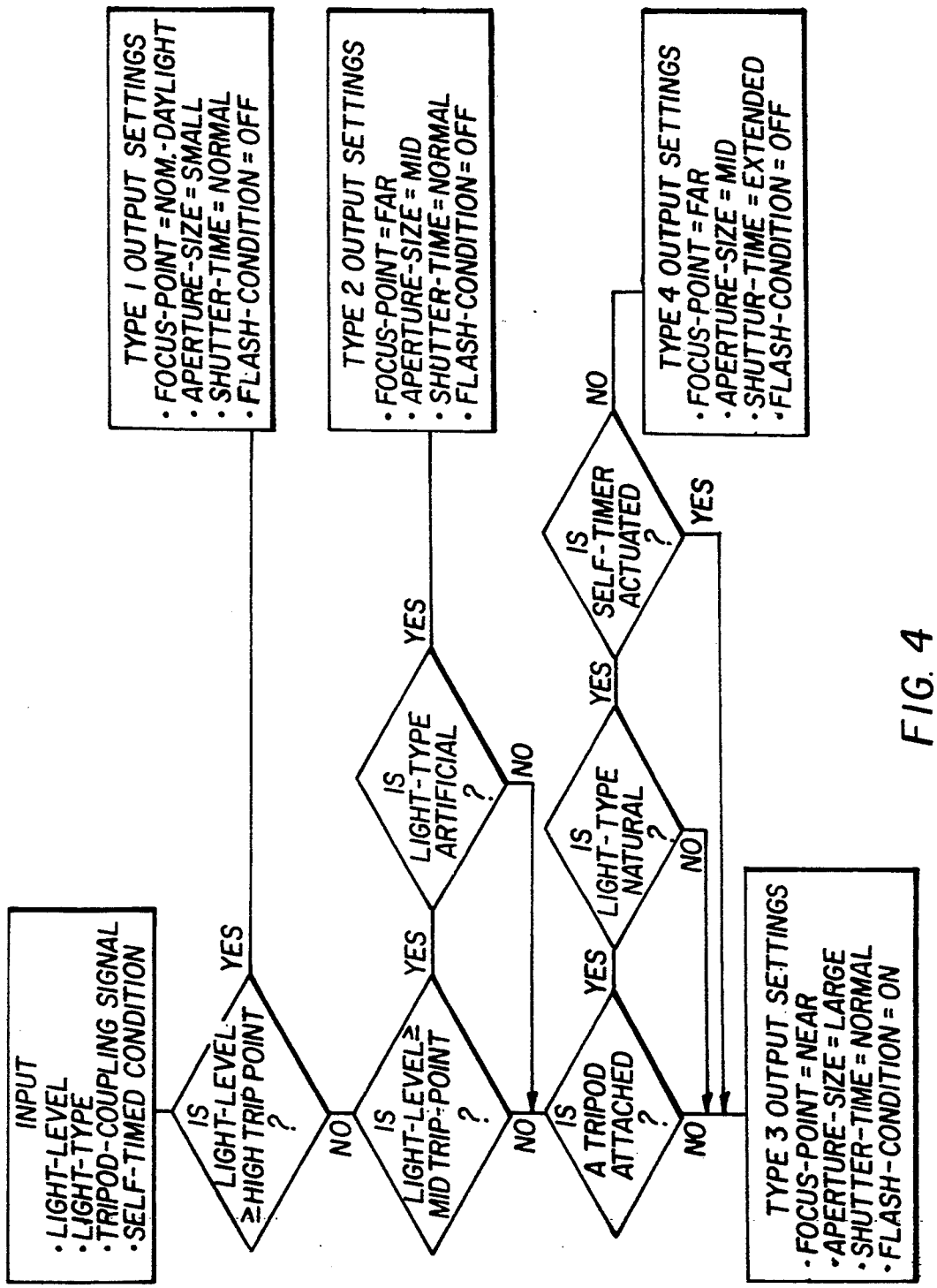
FIG. 4 is a flow diagram illustrating the operation of the camera system illustrated in FIG. 3.

Based on the calculations set forth above, the Type Three output illustrated in FIGS. 1 and 4 could be modified such that the lens position is set to the nominal-daylight position, if the flash unit 16 has a guide number of at least 38.5 and an underexposure limit of one stop is desired, or the flash unit 16 has a guide number of at least 27.3 and an underexposure limit of two stops is desired. Thus, the lens 10 would only have to be positioned between the nominal-daylight position required for Type One and Type Three output settings, and the far position required for Type Two and Type Four output settings.

Additional simplification results if the guide number of the flash unit 16 is sufficient to require only two aperture openings for all output settings. Assuming, for example, that the flash unit 16 has a guide number of 52.8 and a two stop underexposure limit was acceptable, an f/5.6 aperture opening could by used in the Type Two, Type Three and Type Four output settings illustrated in FIGS. 2 and 4, thereby eliminating the need for the f/4.0 setting previously required for the Type Three output settings.

The invention has been described with reference to certain preferred embodiments thereof. It will be understood, however, that modifications and variations are possible within the scope of the appended claims. For example, U.S. Pat. No. 4,827,119 was referenced as disclosing a structure that could be employed for the ambient light type determination circuit 22 shown in FIG. 1. It will be understood, however, that the invention is not limited to this specific structure. The system disclosed in U.S. Pat. No. 4,827,119 is capable of discriminating light into categories such as tungsten, fluorescent or natural daylight. The present invention, however, only needs to have the ambient light defined as either natural or artificial. Thus, less complicated systems for light type discrimination can be employed. For example, spectral energy values at key wavelengths (red, blue) can be compared. Alternatively, a manual operator control can be utilized to send a signal to the CCP 18 indicating whether the ambient light condition is natural or artificial.

Component List

10 Lens
12 Aperture
14 Shutter
16 Flash Unit
18 Camera Control Processor
20 Light Intensity Measurement Circuit
22 Light Type Determination Circuit
24 Operator Control

What is claimed is:

1. A camera system comprising: a lens that is adjustable between a plurality of lens focus positions; an aperture that is adjustable between a plurality of openings; a shutter; a flash unit; ambient light measurement means for measuring the ambient light of a scene to be photographed and generating a signal indicative thereof; ambient light type determination means for generating a signal indicative of whether the ambient light is natural light or artificial light; and control means, responsive to the signals generated by the ambient light measurement means and the ambient light type determination means, for controlling the focus position of the lens, the opening of the aperture and the operation of the shutter and flash unit.

2. A camera system as claimed in claim 1, wherein the lens is adjustable between nominal-daylight, far and near positions, and the aperture is adjustable between small, mid-position and large openings.

3. A camera system as claimed in claim 2, wherein the control means positions the lens to the nominal-daylight position, opens the aperture to the small opening and does not activate the flash unit, when the ambient light level is above a threshold value.

4. A camera system as claimed in claim 3, wherein the control means positions the lens to the near position, sets the aperture to the large opening and activates the flash unit, when the ambient light level is above a threshold value and the ambient light is not artificial light.

5. A camera system as claimed in claim 3, wherein the control means positions the lens to the near position, sets the aperture to the large opening and activates the flash unit when the ambient light level is below a threshold value.

6. A camera system as claimed in claim 2, wherein the control means positions the lens to the far position, sets the aperture to the mid-position opening and does not activate the flash unit, when the ambient light level is below a first threshold value, but is above a second threshold value, and the ambient light is artificial light.

7. A camera system as claimed in claim 2, wherein the control means positions the lens to the near position, sets the aperture to the large opening and activates the flash unit, when the ambient light level is above a threshold value and the ambient light is not artificial light.

8. A camera system as claimed in claim 2, wherein the control means positions the lens to the near position, sets the aperture to the large opening and activates the flash unit when the ambient light level is below a threshold value.

9. A camera system as claimed in claim 2, further comprising a self-timer circuit coupled to the control means and a tripod sensing means coupled to the control means, and wherein the shutter is controllable between a normal exposure time period and an extended exposure time period.

10. A camera system as claimed in claim 9, wherein the control means positions the lens to the nominal-daylight position, opens the aperture to the small opening, does not activate the flash unit and controls the shutter to open for the normal exposure time period, when the ambient light level is above a threshold value.

11. A camera system as claimed in claim 9, wherein the control means positions the lens to the far position, sets the aperture to the mid-position opening, does not activate the flash unit and controls the shutter to open for the normal exposure time period, when the ambient light level is below a first threshold value and above a second threshold value, and the ambient light is artificial light.

12. A camera system as claimed in claim 9, wherein the control means positions the lens to the far position, sets the aperture to the mid-position opening, does not activate the flash unit, and controls the shutter to open for the extended exposure time period, when the ambient light level is below a threshold value, the tripod sensing means generates a tripod-present signal, the ambient light is natural light and the self-timer is not activated.

13. A camera system as claimed in claim 9, wherein the camera control means positions the lens to the near position, sets the aperture to the large opening, activates the flash unit and controls the shutter to open for the normal shutter time period, when the ambient light level is below a threshold level, the tripod sensing means generates a tripod-present signal, the ambient light is natural light, and the self-timer is activated.

14. A camera system as claimed in claim 9, wherein the camera control means positions the lens to the near position, sets the aperture to the large opening, activates the flash unit and controls the shutter to open for the normal shutter time period, when the ambient light level is below the first and second threshold levels, the tripod sensing means generates a tripod-present signal and the ambient light is not natural light.

15. A camera system as claimed in claim 9, wherein the camera control means positions the lens to the near position, sets the aperture to the large opening, activates the flash unit and controls the shutter to open for the normal shutter time period, when the ambient light level is below a threshold level and the tripod sensing means does not generate a tripod-present signal.

16. A camera system comprising:
a lens that is adjustable between nominal-daylight, far and near lens focus positions; an aperture that is adjustable between small, mid-position and large openings; a shutter; a flash unit; ambient light measurement means for measuring the ambient light of a scene to be photographed and generating a signal indicative thereof; ambient light type determination means for generating a signal indicative of whether the ambient light is natural light or artificial light; and control means, responsive to the signals generated by the ambient light measurement means and the ambient light type determination means, for controlling the focus position of the lens, the opening of the aperture and the operation of the shutter and flash unit;
wherein the control means:
positions the lens to the nominal-daylight position, opens the aperture to the small opening and does not activate the flash unit, when the ambient light level is above a first threshold value;
positions the lens to the far position, sets the aperture to the mid-position opening and does not activate the flash unit, when the ambient light level is below the first threshold value, but is above a second threshold value, and the ambient light is artificial light;
positions the lens to the near position, sets the aperture to the large opening and activates the flash unit, when the ambient light level is above the second threshold value and the ambient light is not artificial light; and
positions the lens to the near position, sets the aperture to the large opening and activates the flash unit when the ambient light level is below the second threshold value.

17. A camera system comprising:
a lens that is adjustable between nominal-daylight, far and near lens focus positions; an aperture that is adjustable between small, mid-position and large openings; a shutter; a flash unit; ambient light measurement means for measuring the ambient light of a scene to be photographed and generating a signal indicative thereof; ambient light type determination means for generating a signal indicative of whether the ambient light is natural light or artificial light; a self-timer circuit; a tripod sensing means; and control means, responsive to the signals generated by the ambient light measurement means and the ambient light type determination means, the self-timer circuit and the tripod sensing means, for controlling the focus position of the lens, the opening of the aperture and the operation of the shutter and flash unit;
wherein the control means:
positions the lens to the nominal-daylight position, opens the aperture to the small opening, does not activate the flash unit and controls the shutter to open for a normal exposure time period, when the ambient light level is above a first threshold value;
positions the lens to the far position, sets the aperture to the mid-position opening, does not activate the flash unit and controls the shutter to open for the normal exposure time period, when the ambient light level is below the first threshold value and above a second threshold value, and the ambient light is artificial light;
positions the lens to the far position, sets the aperture to the mid-position opening, does not activate the flash unit, and controls the shutter to open for an extended exposure period, when the ambient light level is below the first and second threshold values, the tripod sensing means generates a tripod present signal, the ambient light is natural light and the self-timer is not activated;
positions the lens to the near position, sets the aperture to the large opening, activates the flash unit and controls the shutter to open for the normal shutter time period, when the ambient light level is below the first and second threshold levels, the tripod sensing means generates a tripod present signal, the ambient light is natural light and the self timer is activated;
positions the lens to the near position, sets the aperture to the large opening, activates the flash unit and controls the shutter to open for the normal shutter time period, when the ambient light level is below the first and second threshold levels, the tripod sensing means generates a tripod present signal and the ambient light is not natural light; and
positions the lens to the near position, sets the aperture to the large opening, activates the flash unit and controls the shutter to open for the normal shutter time period, when the ambient light level is below the first and second threshold levels and the tripod sensing means does not generate a tripod present signal.

* * * * *